(12) United States Patent
Wang (10) Patent No.: US 7,703,567 B2
(45) Date of Patent: Apr. 27, 2010

(54) MECHANISM FOR REDUCING AND FOLDING A PERSON CARRYING VEHICLE AND A METHOD FOR OPERATING SAME

(75) Inventor: Arthur Wang, Kaohsiung (TW)

(73) Assignee: Freerider Corp., Kaohsiung (TW)

( * ) Notice: Subject to any disclaimer, the term of this patent is extended or adjusted under 35 U.S.C. 154(b) by 352 days.

(21) Appl. No.: 11/808,597

(22) Filed: Jun. 12, 2007

(65) Prior Publication Data
US 2008/0309046 A1    Dec. 18, 2008

(51) Int. Cl.
*B62B 3/02* (2006.01)
(52) U.S. Cl. ................................. 180/208; 280/639
(58) Field of Classification Search ............... 180/208, 180/250.1, 287; 280/639, 647, 650, 250.1, 280/287; 297/65, 341, 15, 344.15, 344.16, 297/344.17
See application file for complete search history.

(56) References Cited

U.S. PATENT DOCUMENTS

| | | | | |
|---|---|---|---|---|
| 1,231,156 A | * | 6/1917 | Heaslet | 297/15 |
| 3,004,619 A | * | 10/1961 | Straussler | 180/208 |
| 3,770,289 A | * | 11/1973 | Dougherty et al. | 280/639 |
| 4,065,178 A | * | 12/1977 | Carella et al. | 297/341 |
| 4,913,252 A | * | 4/1990 | Bartley et al. | 180/208 |
| 5,238,082 A | * | 8/1993 | Stegeman et al. | 180/208 |
| 5,722,726 A | * | 3/1998 | Matsumiya | 297/322 |
| 6,176,337 B1 | * | 1/2001 | McConnell et al. | 180/208 |
| 6,851,498 B1 | * | 2/2005 | Sauve | 180/208 |
| 7,104,346 B2 | * | 9/2006 | Schaffner | 180/65.1 |
| 7,159,681 B1 | * | 1/2007 | Sauve | 180/208 |
| 7,341,121 B2 | * | 3/2008 | Flowers et al. | 180/6.66 |
| 2003/0184054 A1 | * | 10/2003 | Wang | 280/651 |
| 2008/0203772 A1 | * | 8/2008 | Holdampf | 297/15 |
| 2009/0241723 A1 | * | 10/2009 | Wang | 74/551.3 |
| 2009/0284037 A1 | * | 11/2009 | Wang | 296/65.05 |
| 2009/0295127 A1 | * | 12/2009 | Wang | 280/639 |
| 2009/0308678 A1 | * | 12/2009 | Chen | 180/220 |

* cited by examiner

*Primary Examiner*—Paul N Dickson
*Assistant Examiner*—Jordan Golomb
(74) *Attorney, Agent, or Firm*—Rosenberg, Klein & Lee (57) ABSTRACT

A person carrying vehicle includes a main frame, a seat pivoted on the main frame, a front frame, an articulate supporting member connecting the main frame and the front frame, and a telescopic steering mechanism pivoted on the front frame; by means of pivoting supporting rods of the seat downwards, folding the articulate supporting member as well as shorting and pivoting the steering mechanism, the vehicle can be reduced into a not-in-use configuration, wherein the supporting rods and a seat pad are received in a hollow holding portion of the main frame, a footrest board of the front frame hidden under the main frame, and a tube part of the steering mechanism is received in grooves on the seat; the vehicle has a lift handle at a front, and auxiliary casters at a rear, which are used for the vehicle to be moved in a sloping position on the floor.

12 Claims, 12 Drawing Sheets

MECHANISM FOR REDUCING AND FOLDING A PERSON CARRYING VEHICLE AND A METHOD FOR OPERATING SAME

BACKGROUND OF THE INVENTION

1. Field of the Invention

The present invention relates to a reducing and folding mechanism of a person carrying vehicle, more particularly, one which can be operated to reduce and fold the person carrying vehicle into a flat not-in-use configuration for easy storage and transportation; the vehicle has a lift handle at a front end and auxiliary casters at a rear, which can be used together for the vehicle to be moved into a sloping position on the floor after the vehicle is reduced to the not-in-use configuration.

2. Brief Description of the Prior Art

Wheelchairs used to be convenient vehicles for the elderly, and people who suffer from leg injury, paralysis of lower half parts of bodies, serious sicknesses etc. However, conventional wheelchairs aren't electricity-powered, and the riders have to exert a certain amount of physical force on the wheels so as to move the wheelchairs. Therefore, conventional wheelchairs can only move at a relatively low speed, and the scope of their application is limited.

Currently, electric walk-substituting carts, which are used with the elderly, and people who suffer from leg injury, paralysis of lower half parts of bodies, serious sicknesses etc, are getting more popular than conventional wheelchairs. However, such carts can't be folded and reduced if they aren't needed temporarily. In other words, they will still occupy relatively much space, and are difficult to store and transport when they aren't in use. To overcome the above problem, the industry develops an improvement on an electric walk-substituting cart, which can be separated into several main parts so as to occupy less space if it isn't needed temporarily. Because it takes time and labor to divide the cart into several main parts, the cart isn't very convenient to use either.

SUMMARY OF THE INVENTION

It is a main object of the invention to provide an improvement on a person carrying vehicle to overcome the above problems.

A vehicle according to an embodiment of the present invention includes a main frame, a seat pivoted on the main frame, a front frame, an articulate supporting member connecting the main frame and the front frame, and a telescopic steering mechanism pivoted on the front frame. By means of pivoting supporting rods of the seat downwards, folding the articulate supporting member, and shortening and pivoting the steering mechanism, the vehicle can be reduced into a not-in-use configuration for easy storage and transportation; in the not-in-use configuration, the supporting rods and a seat pad are received in a hollow holding portion of the main frame, a footrest board of the front frame hidden under the main frame, and a tube part of the steering mechanism is received in grooves on the seat. The vehicle further includes a lift handle at a front, and auxiliary casters at a rear. Therefore, when the vehicle is the not-in-use configuration, a person is allowed to hold and lift the lift handle for the vehicle to be supported on the auxiliary casters in a sloping position on the floor so as to be easily movable.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
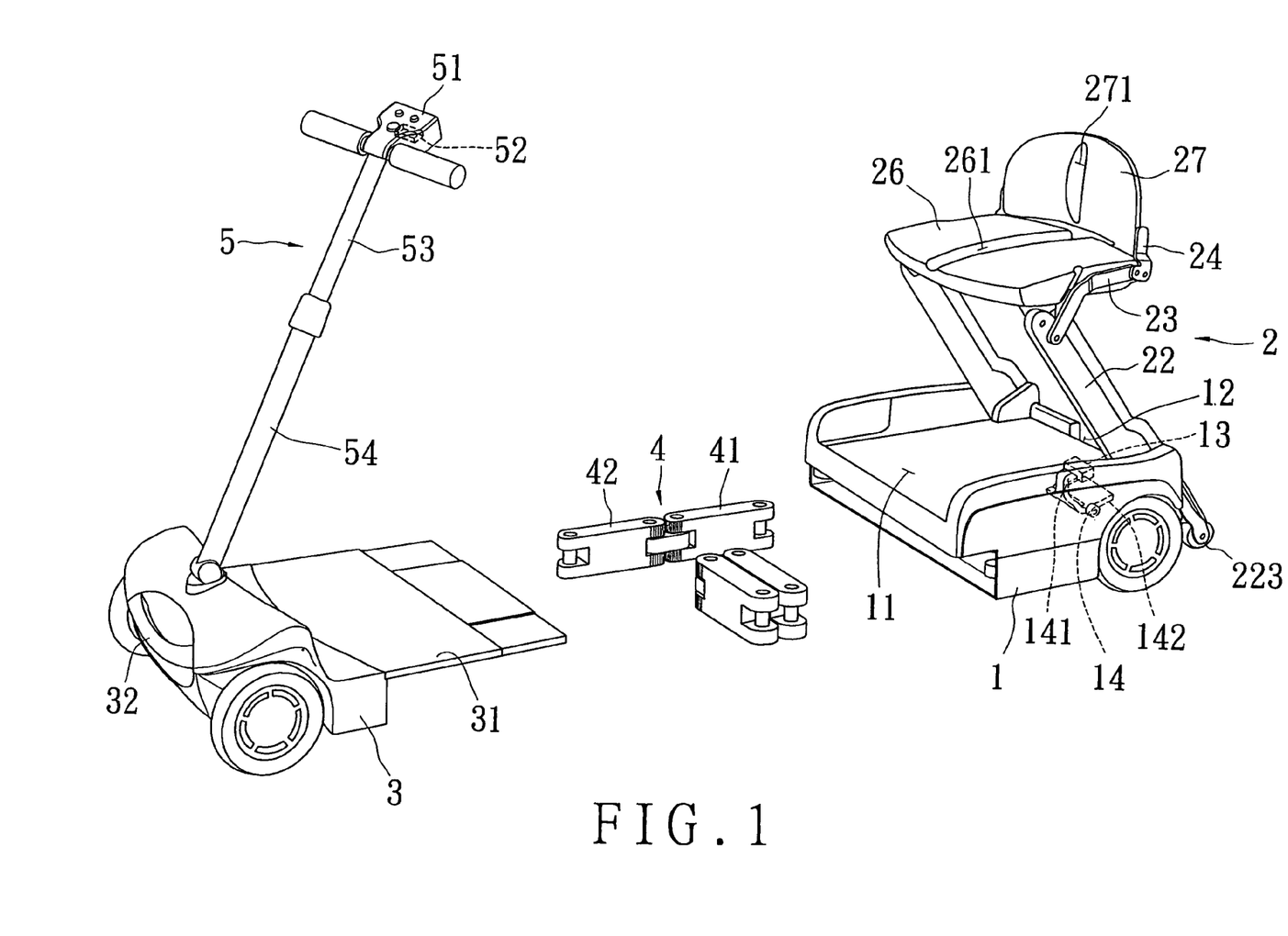
FIG. 1 is an exploded perspective view of the present invention.
Figure 2:
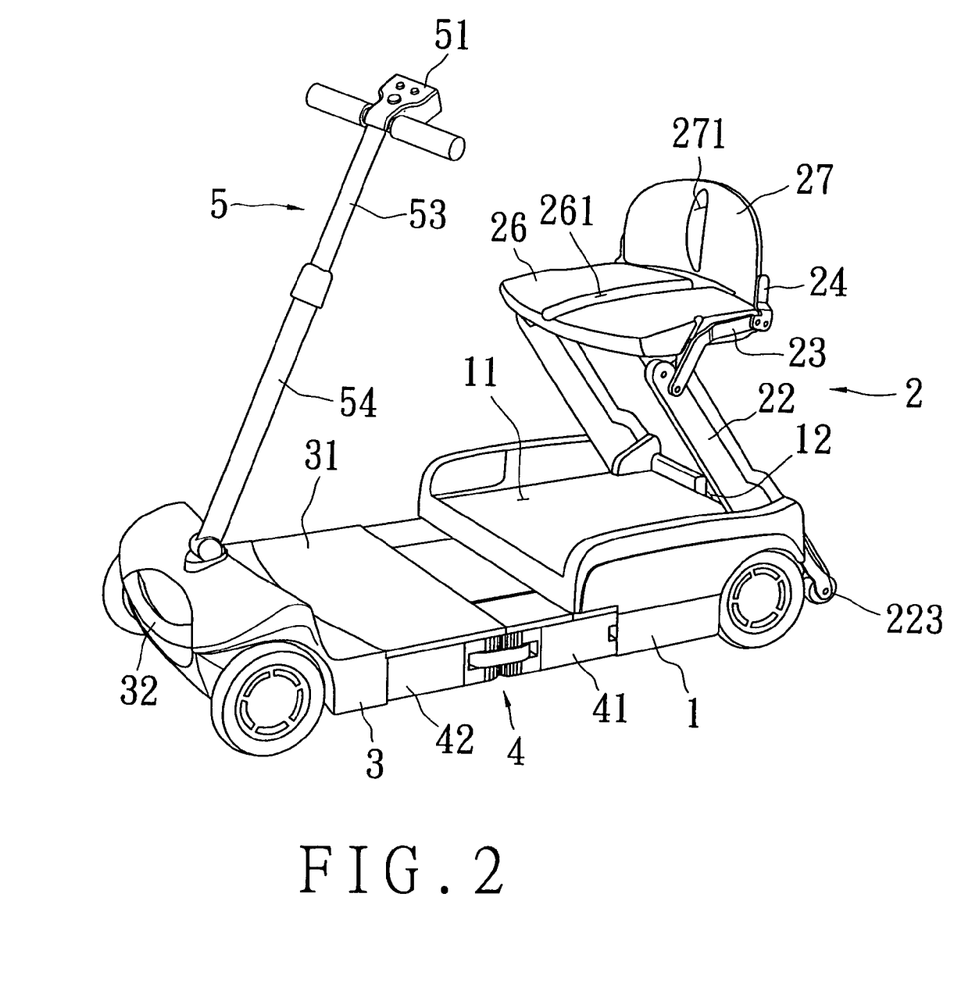
FIG. 2 is a perspective view of the present invention.
Figure 3:
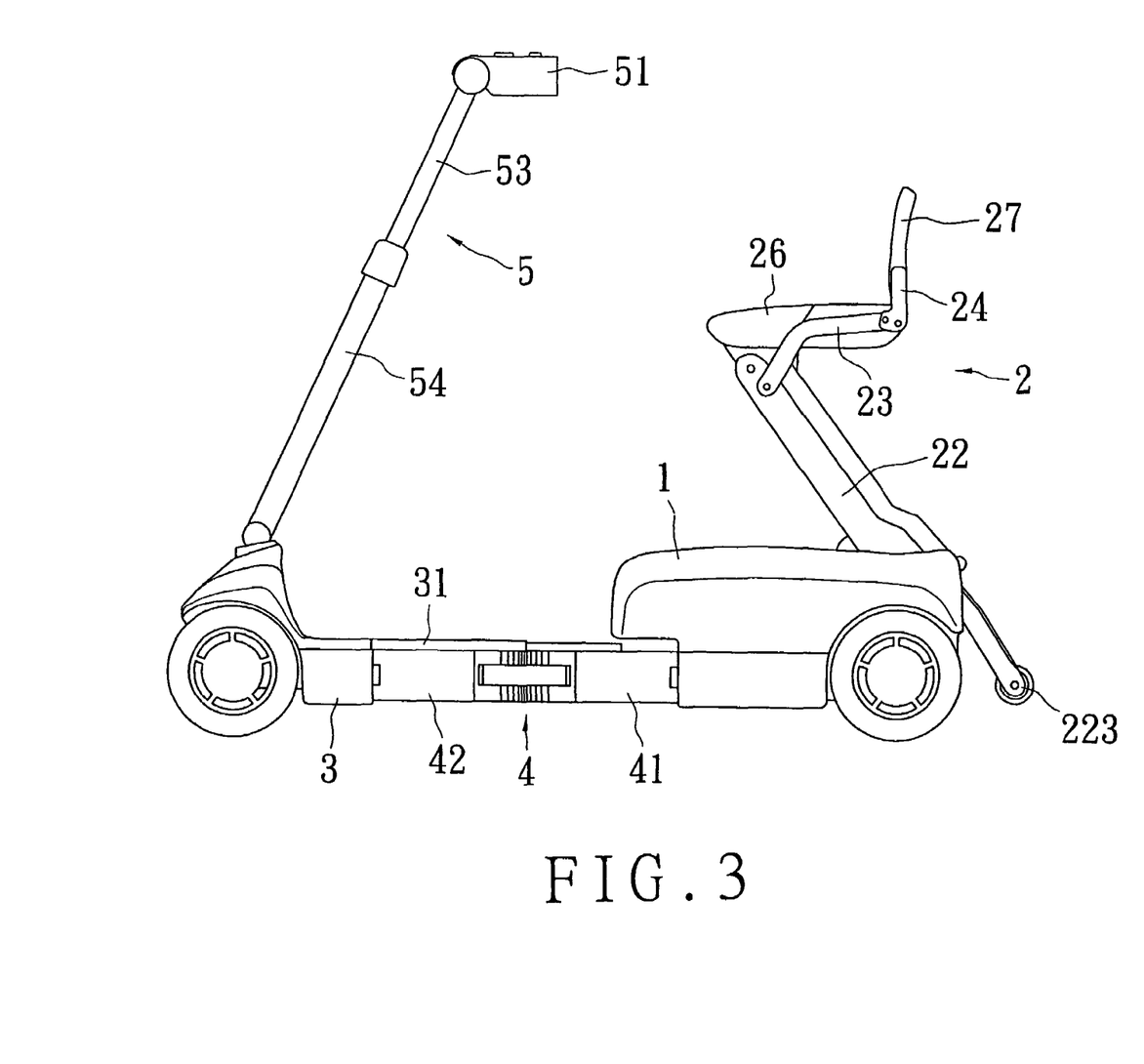
FIG. 3 is a side view of the present invention.
Figure 4:
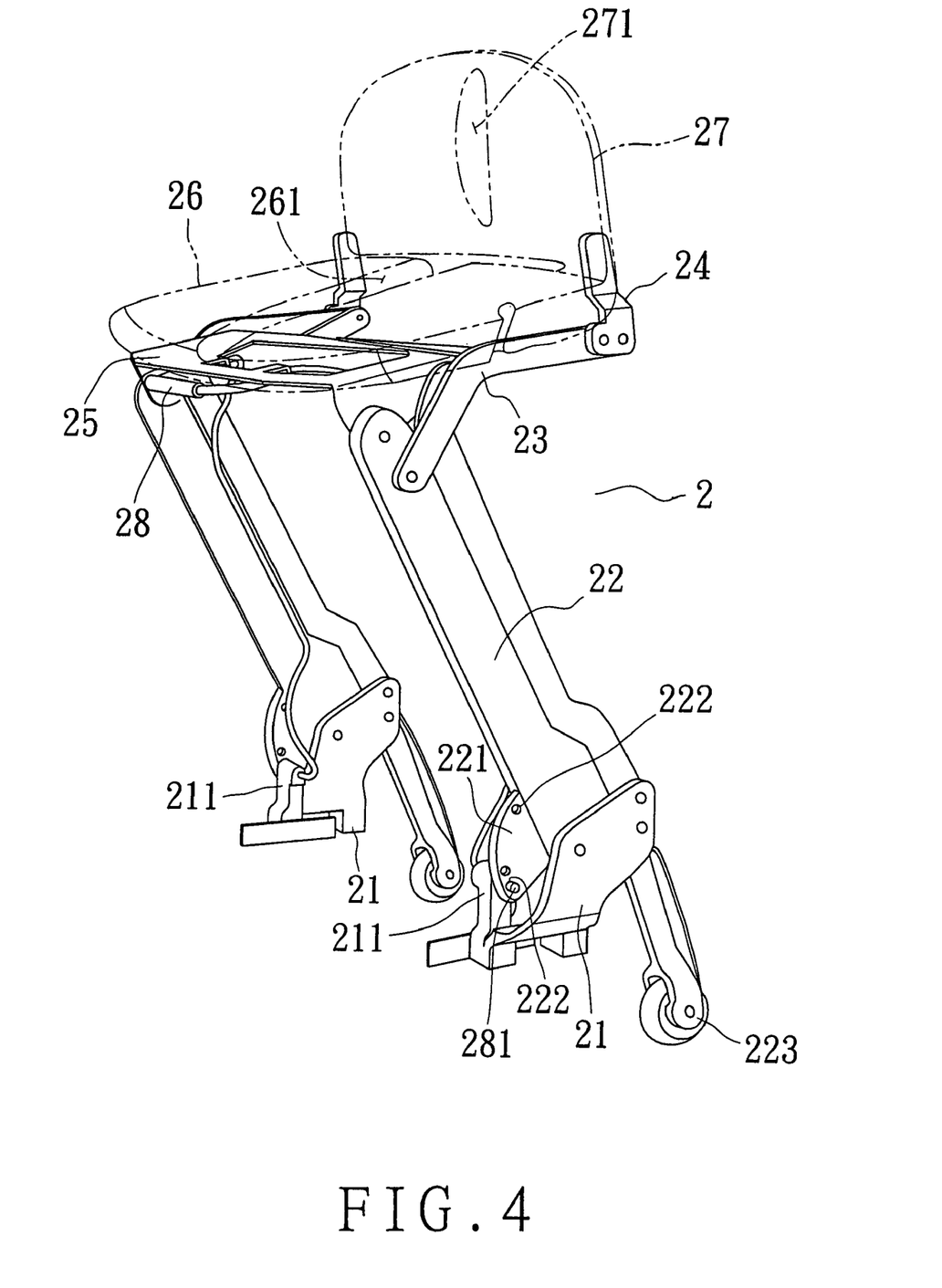
FIG. 4 is a perspective view of the seat of the present invention.

Referring to FIGS. 1, 2, and 3, a preferred embodiment of a person carrying vehicle of the present invention includes:

a main frame part 1, the main frame part has a hollow holding portion 11 on an upper side thereof, a recess 12 next to a rear end of the hollow holding portion 11, and a through hole 13 communicating with the recess 12; there is a fastening piece 14 fitted to the main frame part 1, which includes a fastening portion 141 at one end, and a poked portion 142 at the other end, which usually sticks into the recess 12 through the through hole 13 at the fastening portion 141;

a seat 2 pivoted on the hollow holding portion 11 of the main frame part 1; referring to FIG. 4 as well, the seat 2 includes two connecting base parts 21 secured on two sides of the hollow holding portion 11 of the main frame part 1, and two supporting rod parts 22 each pivoted to a respective one of the connecting base parts 21; each of the connecting base parts 21 has a locating piece 211 on one side; each of the supporting rod parts 22 has a plate-shaped protrusion 221, which has spaced-apart locating holes 222 thereon, and which is faced with a corresponding said locating piece 211 of the connecting base parts 21; there are two auxiliary casters 223, which are each pivoted on a lower portion of one of the supporting rod parts 22, and are outside the main frame part 1;

the seat 2 includes two bent arms 23, which are each pivoted to an upper end of one of the supporting rod parts 22; the seat 2 further includes two co-moving rods 24, which are each pivoted to a rear end of one of the bent arms 23; the seat 2 includes a supporting member 25, which is placed between the supporting rod parts 22, and between the bent arms 23; the seat 2 further includes a seat pad 26 fixedly supported on the supporting member 25, and a back 27, which is pivoted to a rear end of the seat pad 26 as well as being joined to the co-moving rods 24 at two sides thereof; the seat pad 26 and the back 27 have grooves 261, and 271 respectively;

there is a controlling element 28 provided on the seat 2; the controlling element 28 is connected to two fixing rods 281, which pass through the locating pieces 211 as well as the locating holes 222 on the plate-shaped protrusions 221 of the supporting rod parts 22 so as to fix the seat 2 in position; therefore, after the controlling element 28 is operated so as to separate the fixing rods 281 from the locating holes 222, the seat 2 can be adjusted to another height (position), wherein the fixing rods 281 are relocated in other ones of the locating holes 222;

a front frame part 3 arranged in front of the main frame part 1; the front frame part 3 includes a lift handle 32 at a front end thereof, and a footrest board 31, which is next to the main frame part 1;

a composite supporting member 4 arranged under the footrest board 31 of the front frame part 3; the composite supporting member 4 includes at least a pair of rear and front supporting rods 41 and 42, which are pivoted together at first ends thereof, and which are pivoted at second (other) ends thereof to the main frame part 1, and the front frame part 3 respectively; and a steering mechanism 5 pivoted on an upper side of the front frame part 3; the steering mechanism 5 includes an outer tube 54 pivoted on the upper side of the front frame part 3, an inner tube 53 inserted in the outer tube 54 so as to slide relative to the outer tube 54. The steering mechanism 5 further includes a control panel 51, which is joined to an upper end of the inner tube 53, and has a detainment recess 52 on one side.

Figure 5:
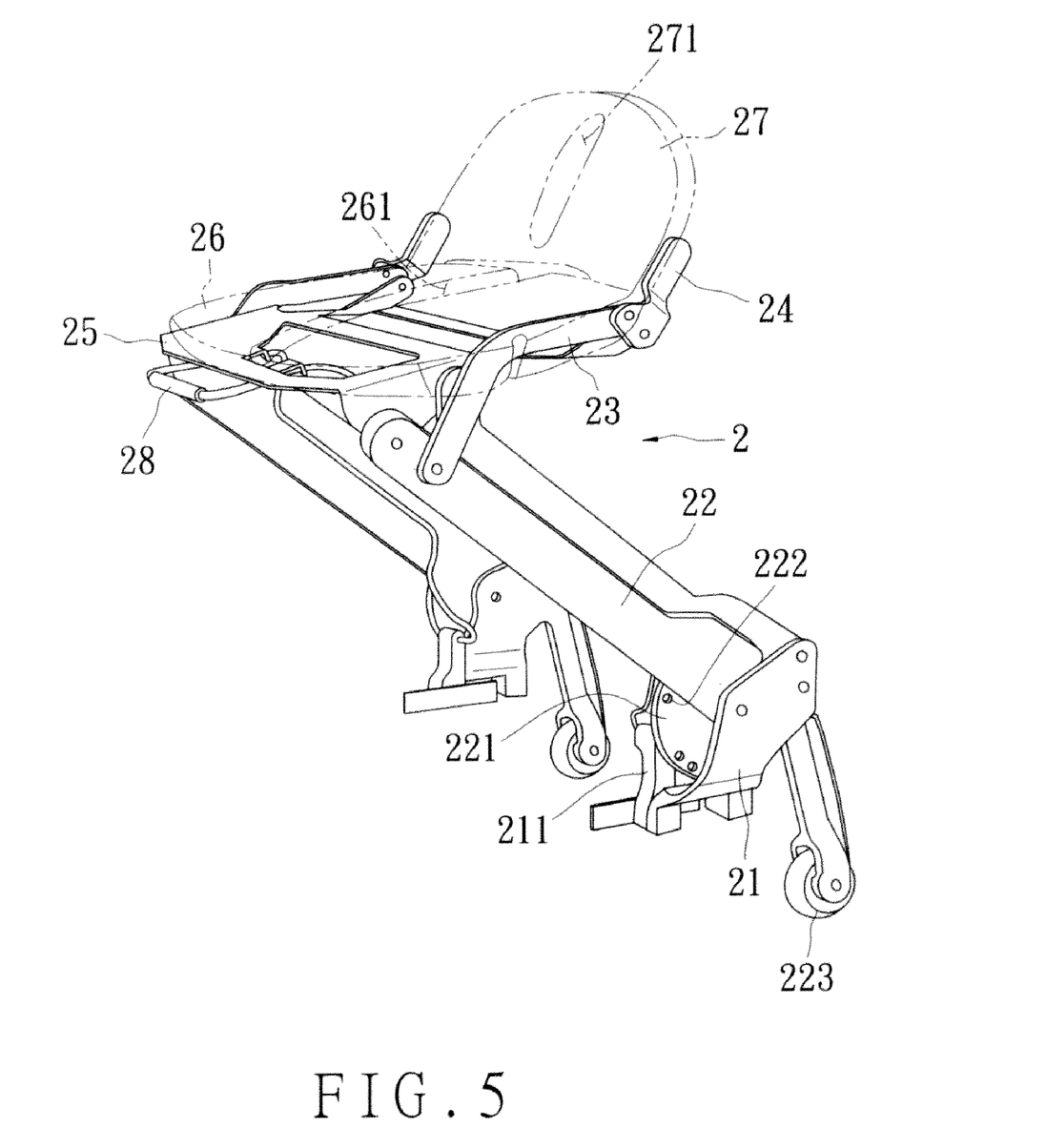
FIG. 5 is a perspective view of the seat, taken when the seat is under a folding operation (step one)
Figure 6:
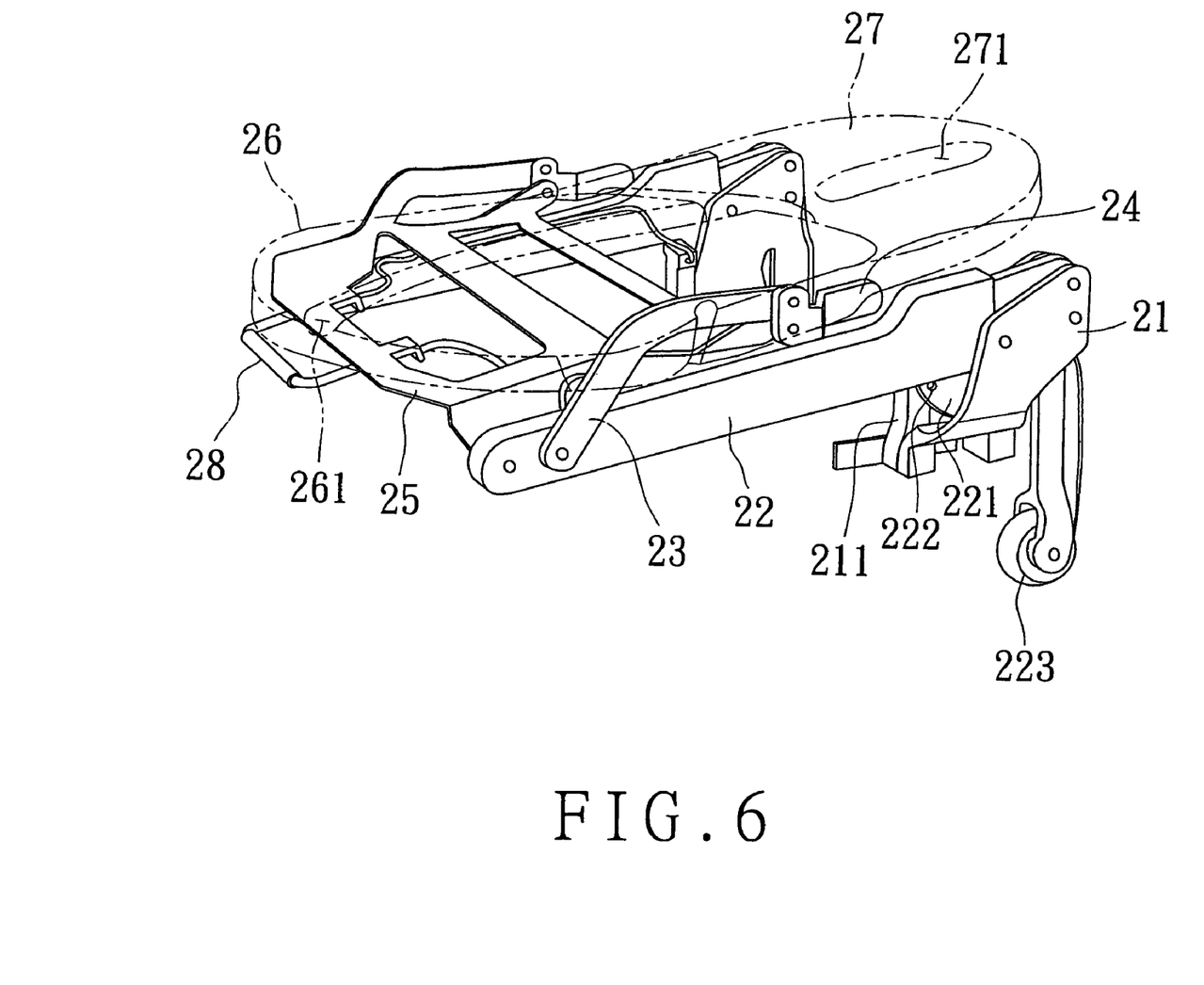
FIG. 6 is a perspective view of the seat, taken when the seat is under a folding operation (step two)
Figure 7:
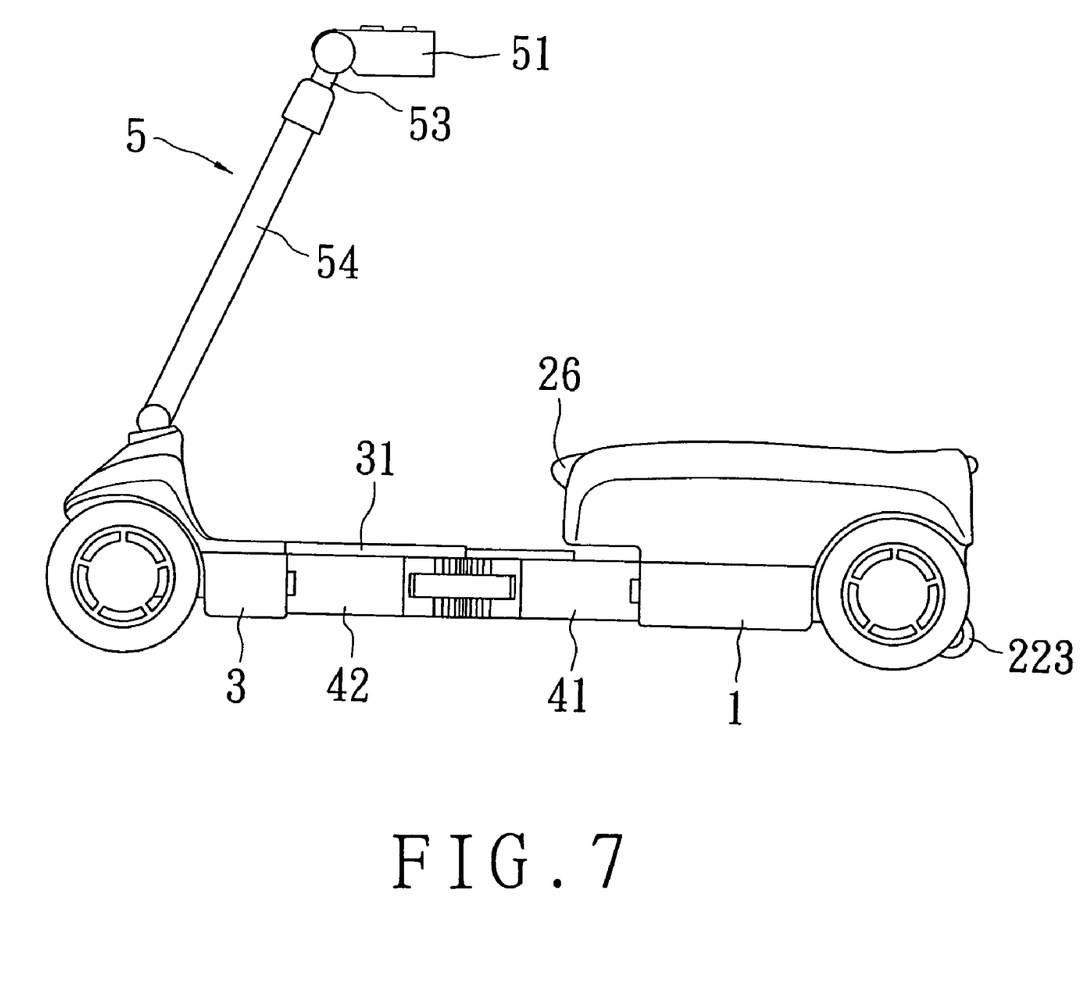
FIG. 7 is a side view of the vehicle of the present invention under a reducing operation (step one)

Shown in FIGS. 5 and 6 are the seat 2 under a folding operation, and the seat 2 in a folded position respectively, and shown in FIG. 7 is the person carrying vehicle with the folded seat 2. To fold the seat 2, first the controlling element 28 is operated so as to separate the fixing rods 281 from the locating holes 222 of the plate-shaped protrusions 221 of the supporting rod parts 22, and next the supporting rod parts 22 are pivoted down so as to be received in the hollow holding portion 11 of the main frame part 1; thus, the auxiliary casters 223 are situated next to the rear end of the main frame part 1, and the supporting member 25 and the seat pad 26 are also received in the hollow holding portion 11. At the same time, the motion of the supporting rod parts 22 will be passed on to the back 27 through the bent arms 23 and the co-moving rods 24 such that the back 27 pivots rearwards down so as to be also received in the hollow holding portion 11 of the main frame part 1.

Figure 8:
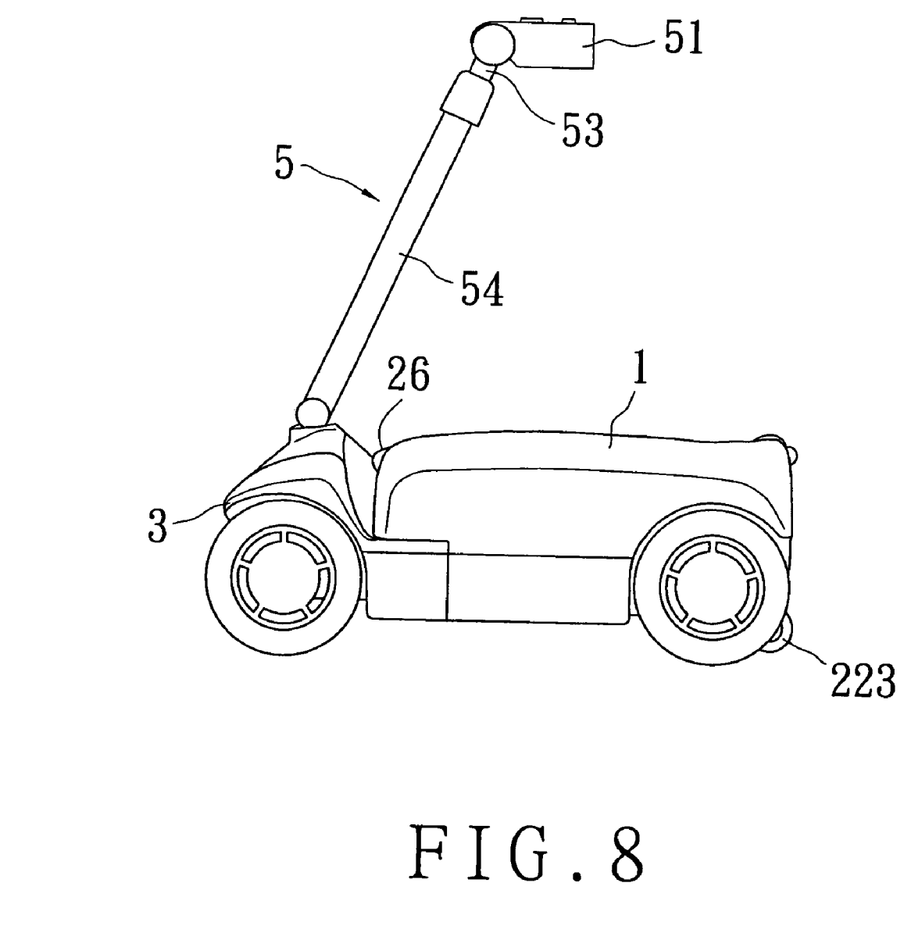
FIG. 8 is a side view of the vehicle of the present invention under a reducing operation (step two)

Shown in FIG. 8 is the person carrying vehicle in a reduced configuration, wherein the supporting member 4 is folded, and the front frame part 3 and the main frame part 1 are even closer together with the footrest board 31 of the front frame part 3 being hidden under the main frame part 1; the supporting member 4 is moved to the folded position by means of pushing the pivotal joint between the rear and the front supporting rods 41 and 42 inwardly.

Figure 9:
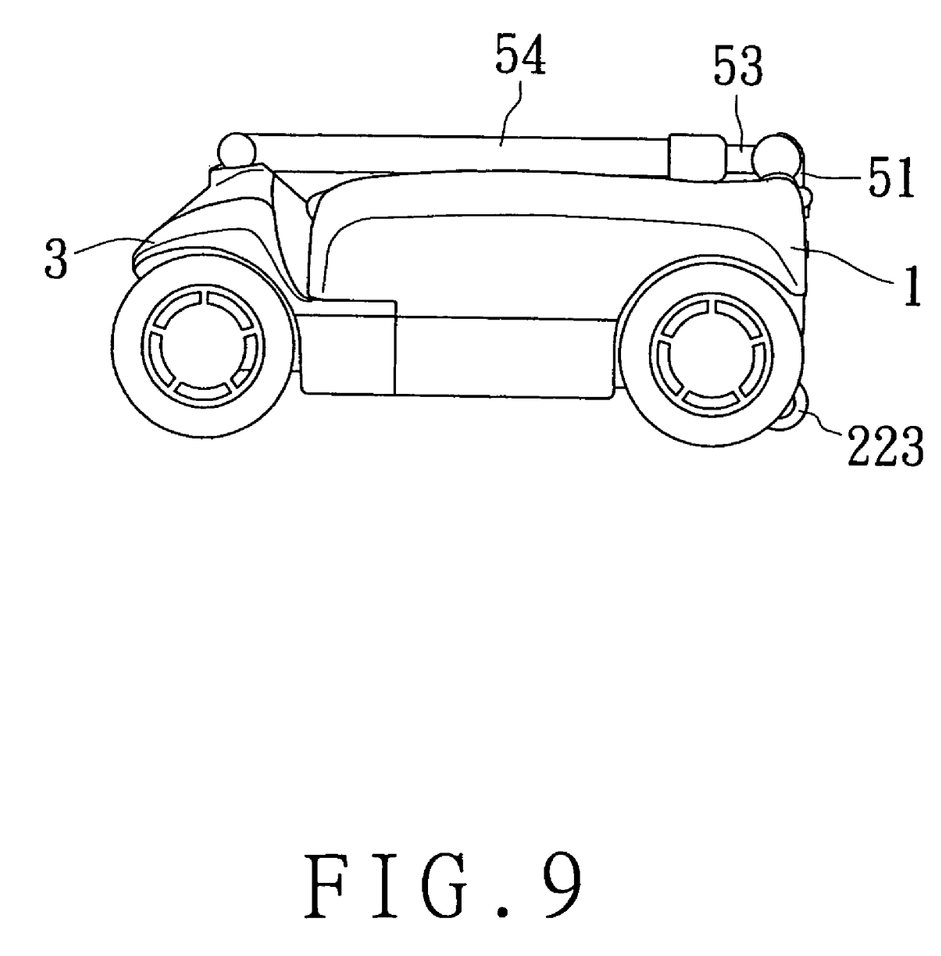
FIG. 9 is a side view of the vehicle of the present invention under a reducing operation (step three)
Figure 10:
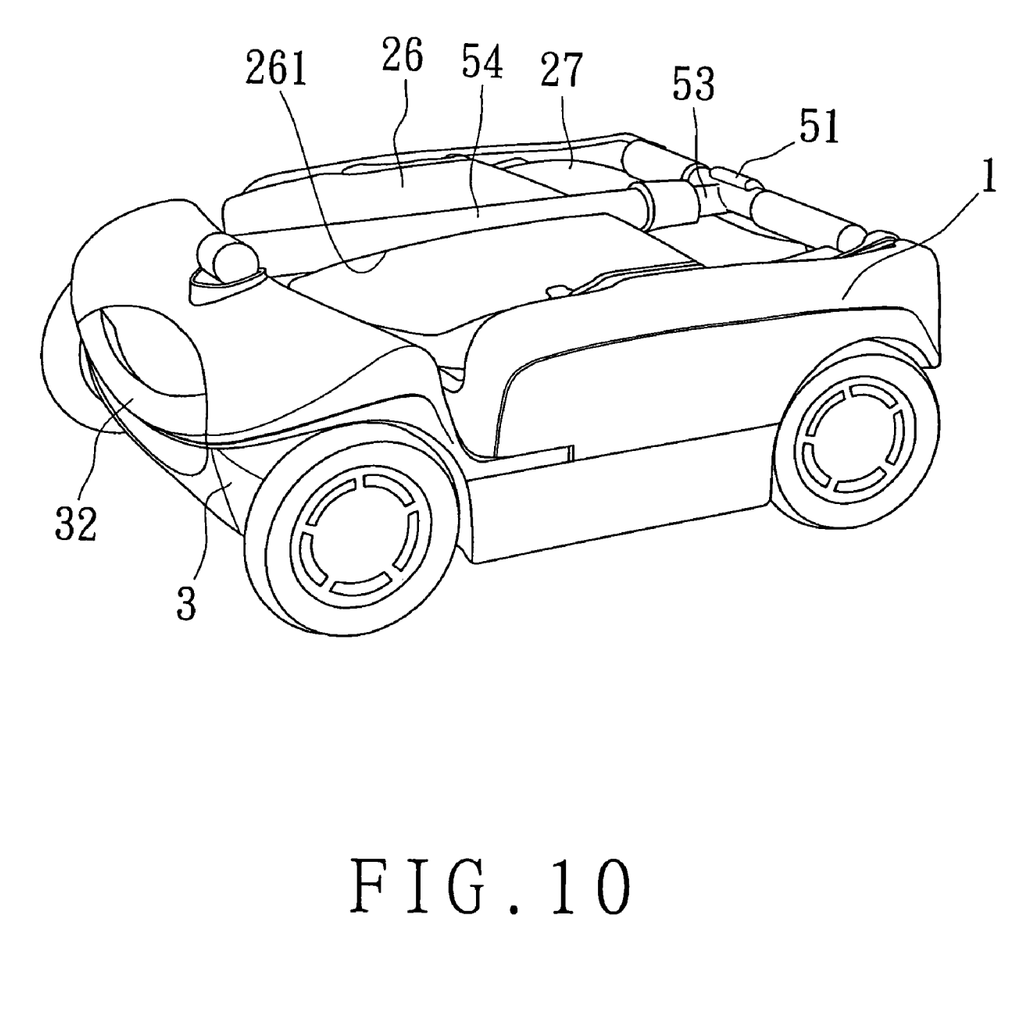
FIG. 10 is a perspective view of the vehicle of the present invention in a reduced configuration.
Figure 11:
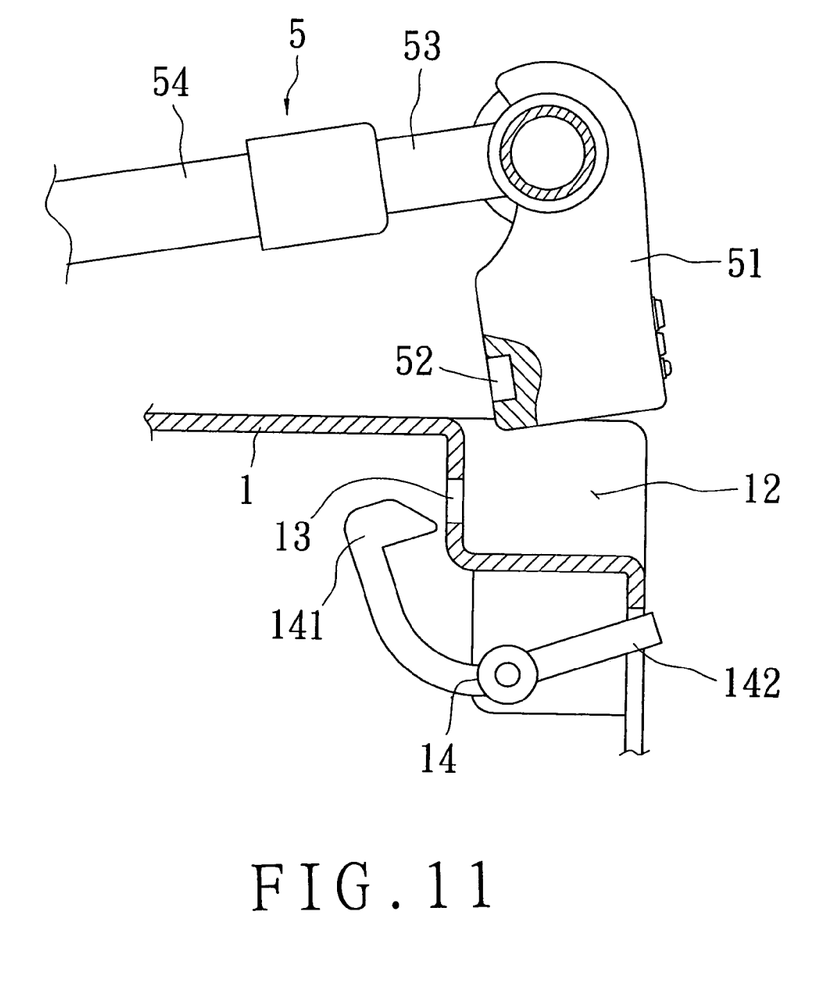
FIG. 11 is a partial view of the handlebars being moved to a not-in-use position.
Figure 12:
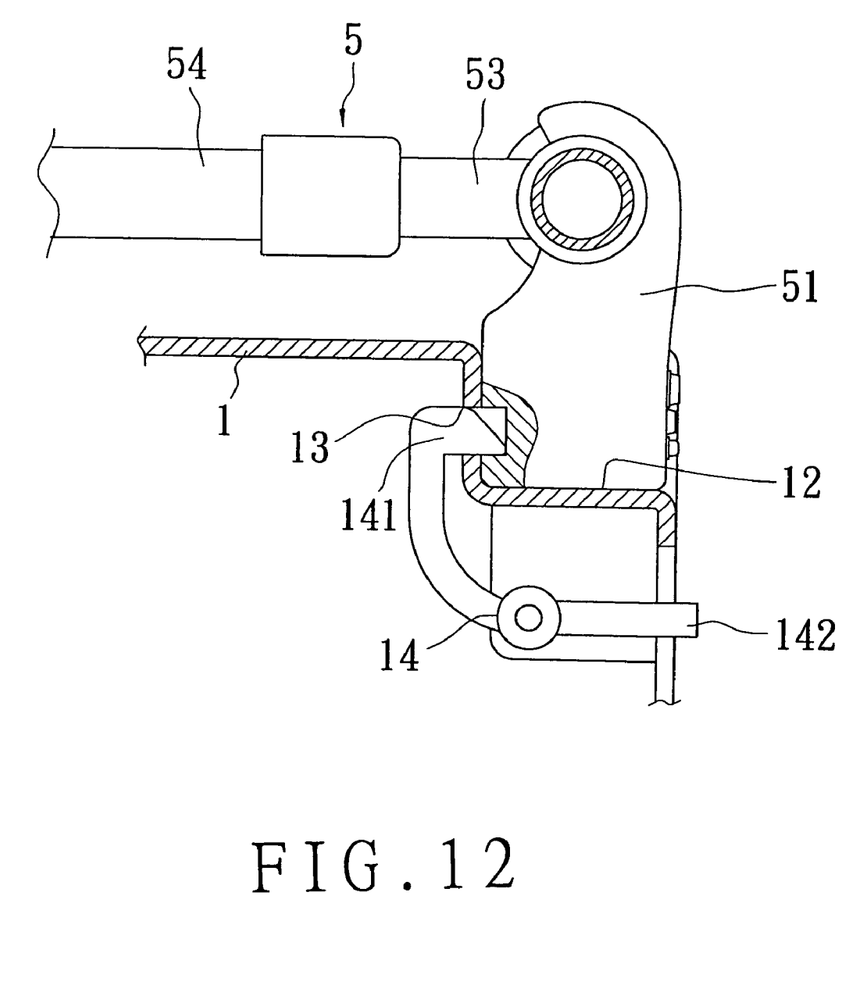
FIG. 12 is a partial view of the handlebars in a not-is-use position.

Referring to FIGS. 9 and 10, the person carrying vehicle is further reduced and folded by means of sliding the inner tube 53 into the outer tube 54 as well as pivoting the steering mechanism 5 downwards; consequently, the inner and the outer tubes 53 and 54 will be received in the grooves 271 and 261 of the seat pad 26 and the back 27, and the control panel 51 received in the recess 12 of the main frame part 1. Furthermore, the fastening piece 14 will pass into the detainment recess 52 of the control panel 51 at the fastening portion 141 to fix the steering mechanism 5 in position, as shown in FIGS. 11 and 12. After the vehicle has been reduced and folded to the configuration as shown in FIG. 10, a person is allowed to hold and lift the lift handle 32 on the front frame part 3 so that the vehicle is supported on the auxiliary casters 223 in a sloping position on the floor, and can be easily moved.

From the above description, it can be seen that person carrying vehicle of the present invention has the following advantages over the prior art: it is relatively easy and fast to reduce the vehicle of the present invention; the vehicle will change into a substantially flat shape after the reducing and folding motion. After the vehicle is reduced and folded to the not-in-use configuration, a person is allowed to hold and lift the lift handle for the vehicle to be supported on the auxiliary casters in a sloping position on the floor; thus, the vehicle can be easily moved. In summary, the vehicle is easier to store and transport, and more practical and convenient to use.

What is claimed is:

1. A mechanism for reducing and folding a person carrying vehicle, the person carrying vehicle comprising:
   (a) a main frame part, the main frame part having a hollow holding portion on an upper side thereof;
   (b) a seat pivoted on the hollow holding portion of the main frame part; the seat including:
      two pivotal supporting rod parts, which are each arranged above one of two sides of the hollow holding portion of the main frame part;
      two bent arms, which are each pivoted to an upper end of one of the pivotal supporting rod parts;
      two co-moving rods, which are each pivoted to a rear end of one of the bent arms;
      a seat pad secured between the supporting rod parts as well as between the bent arms; and
      a back pivoted to a rear end of the seat pad; the back being joined to the co-moving rods at two sides thereof;
   (c) a front frame part arranged in front of the main frame part; the front frame part including a footrest board next to the main frame part;
   (d) a composite supporting member arranged under the footrest board of the front frame part; the composite supporting member including a pair of rear and front supporting rods, which are pivoted together at first ends thereof; the rear and the front supporting rods being pivoted at second ends thereof to the main frame part, and the front frame part respectively; and
   (e) a steering mechanism; the steering mechanism including:
      an outer tube pivoted on an upper side of the front frame part;
      an inner tube; the inner tube being inserted in the outer tube so as to slide on the outer tube for changing length of the steering mechanism;
      a control panel joined to an upper end of the inner tube.

2. The vehicle reducing and folding mechanism as claimed in claim 1, wherein the main frame part has a recess next to a rear end of the hollow holding portion, and a through hole communicating with the recess; a fastening piece being fitted to the main frame part, which is used to fasten the steering mechanism when the vehicle is in a reduced and folded configuration; the fastening piece including a fastening portion at one end, and a poked portion at other end; the fastening piece passing into the recess of the main frame part through the through hole at the fastening portion; the control panel of the steering mechanism having a detainment recess thereon for detaining the fastening portion of the fastening piece.

3. The vehicle reducing and folding mechanism as claimed in claim 1, wherein the seat includes two connecting base parts, which are arranged on two sides of the hollow holding portion of the main frame part respectively; the pivotal supporting rod parts of the seat being each pivoted to a respective one of the connecting base parts.

4. The vehicle reducing and folding mechanism as claimed in claim 3, wherein each of the connecting base parts of the seat has a locating piece on one side, and each of the pivotal supporting rod parts has a plate-shaped protrusion having a plurality of spaced-apart locating holes; each said plate-shaped protrusion being faced with a corresponding said locating piece; the seat having a controlling element fitted thereon; the controlling element being connected to a fixing rod, which passes through the locating pieces of the connecting base parts as well as the locating holes of the plate-shaped protrusions of the pivotal supporting rod parts so as to fix the seat in position; the seat being capable of being adjusted in position after the controlling element is operated so as to separate the fixing rod from the locating holes.

5. The vehicle reducing and folding mechanism as claimed in claim 1, wherein each of the pivotal supporting rod parts of the seat has an auxiliary caster pivoted on a lower portion thereon and the front frame part has a lift handle at a front; the auxiliary casters being positioned outside the main frame part.

6. The vehicle reducing and folding mechanism as claimed in claim 1, wherein the seat includes a supporting member for the seat pad, which is placed between the supporting rod parts as well as between the bent arms.

7. The vehicle reducing and folding mechanism as claimed in claim 1, wherein the seat pad and the back of the seat have grooves thereon, in which the steering mechanism will be received when the vehicle is in a reduced and folded configuration.

8. A method for reducing and folding a person carrying vehicle formed by a main frame part having a hollow holding portion, a seat pivoted on the hollow holding portion of the main frame part at two supporting rod parts thereof, a front frame part arranged in front of the main frame part and including a footrest board next to the main frame part, a composite supporting member arranged under the footrest board of the front frame part and having a pair of rear and front supporting rods pivoted together at first ends thereof and pivoted at second ends thereof respectively to the main frame part and the front frame part, and a steering mechanism pivoted at a lower end thereof on the front frame part; where the steering mechanism includes an outer tube pivoted on the front frame part, an inner tube; inserted in the outer tube, the reducing and folding method comprising:
  (a) pivoting the supporting rod parts of the seat downwards so that the supporting rod parts and a seat pad of the seat are received in the hollow holding portion of the main frame part; the seat pad being positioned between the supporting rod parts as well as two bent arms, which are each pivoted to one of the supporting rod parts; the seat including two co-moving rods, which are each pivoted to one of the bent arms, and wherein the seat including a back pivoted to a rear end of the seat pad; the back being joined to the co-moving rods so that it will be pivoted rearwards and down to be received in the hollow holding portion during the downward pivotal motion of the supporting rod parts;
  (b) moving a pivotal joint between the rear and the front supporting rods of the composite supporting member inwardly to fold the composite supporting member for overlapping the front and the main frame parts and hiding the footrest board under the main frame part; and
  (c) sliding the inner tube into the outer tube of the steering mechanism and pivoting the steering mechanism downwards.

9. The method for reducing and folding a person carrying vehicle as claimed in claim 8, wherein the step of pivoting the supporting rod parts is preceded by the step of providing a controlling element fitted to the seat and a fixing rod connected to the controlling element; the pivotal supporting rod parts of the seat each having a plate-shaped protrusion having a plurality of spaced apart locating holes; the fixing rod being capable of being moved out of the locating holes in order for the seat to become free to move by means of operating the controlling element.

10. The method for reducing and folding a person carrying vehicle as claimed in claim 8, wherein the step of pivoting the supporting rod parts is preceded by the step of forming grooves in the seat pad and the back of the seat for receiving the inner and the outer tubes of the steering mechanism when the vehicle is in a reduced and folded configuration.

11. The method for reducing and folding a person carrying vehicle as claimed in claim 8, wherein the step of pivoting the supporting rod parts is preceded by the step of forming a recess next to a rear end of the hollow holding portion of the main frame part, a through hole communicating with the recess, and a detainment recess in a control panel of the steering mechanism; and providing a fastening piece fitted to the main frame part to fasten the steering mechanism when the vehicle is in a reduced and folded configuration; the fastening piece including a fastening portion, which will pass into the detainment recess of the control panel through the through hole so as to fasten the control panel after the control panel is received in the recess of the main frame part.

12. The method for reducing and folding a person carrying vehicle as claimed in claim 8, wherein the step of pivoting the supporting rod parts is preceded by the step of providing the front frame part with a lift handle at a front end thereof, and providing each of the pivotal supporting rod parts of the seat with an auxiliary caster pivoted on a lower portion thereof, the auxiliary casters being positioned outside the main frame part.

* * * * *